US010635360B1

(12) United States Patent
Volvovski et al.

(10) Patent No.: US 10,635,360 B1
(45) Date of Patent: Apr. 28, 2020

(54) ADJUSTING DATA INGEST BASED ON COMPACTION RATE IN A DISPERSED STORAGE NETWORK

(71) Applicant: International Business Machines Corporation, Armonk, NY (US)

(72) Inventors: Ilya Volvovski, Chicago, IL (US); Andrew D. Baptist, Mt. Pleasant, WI (US); Benjamin L. Martin, Chicago, IL (US); Praveen Viraraghavan, Chicago, IL (US); Ying Z. Guo, Palatine, IL (US); Jordan H. Williams, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/174,226

(22) Filed: Oct. 29, 2018

(51) Int. Cl.
*G06F 11/00* (2006.01)
*G06F 3/06* (2006.01)
*G06F 11/10* (2006.01)

(52) U.S. Cl.
CPC ............ *G06F 3/0661* (2013.01); *G06F 3/067* (2013.01); *G06F 3/0608* (2013.01); *G06F 3/0619* (2013.01); *G06F 3/0656* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 8,892,598 B2* | 11/2014 | Motwani | H04L 63/06 707/770 |
| 9,176,820 B2 | 11/2015 | Simha et al. | |
| 9,819,972 B1 | 11/2017 | Vantalon et al. | |
| 9,942,578 B1 | 4/2018 | Vantalon et al. | |
| 10,298,680 B1* | 5/2019 | Thomas | H04L 43/0817 |
| 2013/0166568 A1* | 6/2013 | Binkert | G06F 16/245 707/741 |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Mujtaba M Chaudry
(74) *Attorney, Agent, or Firm* — James Nock; Andrew D. Wright; Roberts Mlotkowski Safran Cole & Calderon, P.C.

(57) ABSTRACT

A method for execution by a compaction management system includes determining observed compaction information based on compaction observed in at least one storage device during an observed timeframe. An estimated compaction rate is generated for a first future timeframe based on the observed compaction information. An updated ingest rate is generated for the first future timeframe based on a current ingest rate and the estimated compaction rate. A first proper subset of a set of data to be written to the at least one storage device is generated based on the updated ingest rate. Storage of the first proper subset in the at least one storage device is facilitated during the first future timeframe. Storage of a remaining proper subset of the set of data in an elastic buffer is facilitated during the first future timeframe, where the elastic buffer utilizes a memory of the compaction management system.

20 Claims, 9 Drawing Sheets

(56) References Cited

U.S. PATENT DOCUMENTS

| | | | |
|---|---|---|---|
| 2014/0279834 A1* | 9/2014 | Tsirogiannis | G06F 16/211 707/602 |
| 2016/0162521 A1* | 6/2016 | Pradhan | G06Q 10/10 707/602 |
| 2016/0188218 A1* | 6/2016 | Gray | H04L 67/1097 711/165 |
| 2016/0239384 A1* | 8/2016 | Slik | G06F 16/22 |
| 2017/0161659 A1* | 6/2017 | Goldstein | G06F 11/0751 |
| 2019/0361767 A1* | 11/2019 | Karthik | G06F 11/0793 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Anonymously; Method and System for Fast and Efficient Data Transmission Across a Network; Jun. 16, 2017; 5 pgs; IP.com No. IPCOM000250241D; IP.com.

Anonymously; System and method for preemptive reservation of resources for bulk data ingest into a database; Jun. 1, 2015; 3 pgs; IP.com No. IPCOM000241793D; IP.com.

Authors, et al: IBM; System and method for improving ingestion rate of data stores; Oct. 16, 2008; 10 pgs; IP.com No. IPCOM000175631D; IP.com.

Gorzig; Data Compaction—Compression without Decompression; 2014; 11 pgs [online: https://scholar.google.com/scholar?hl=en&as_sdt=0%2C44&q=%22Data+Compaction+-+Compression+without+Decompression%22&btnG=].

* cited by examiner

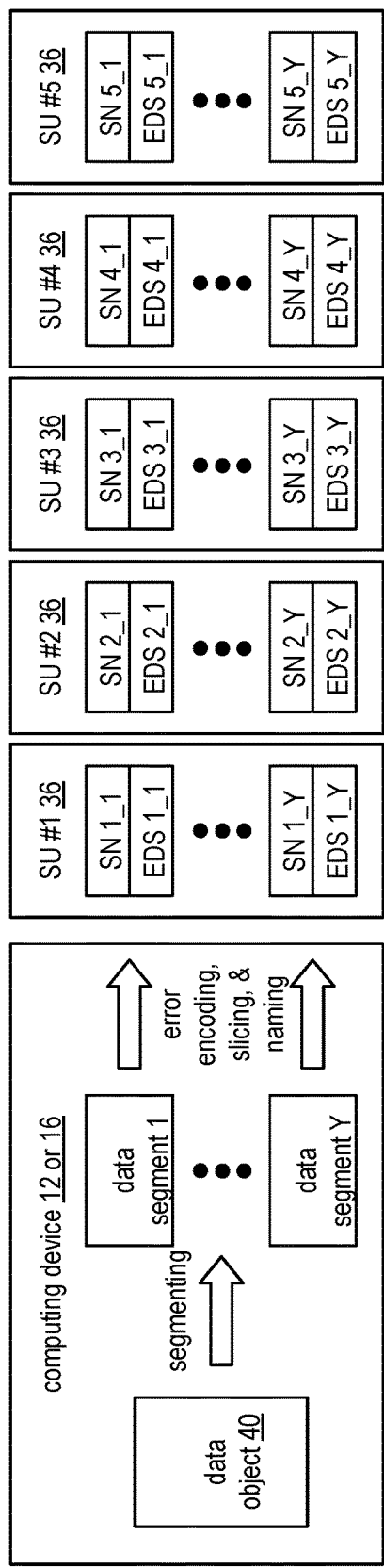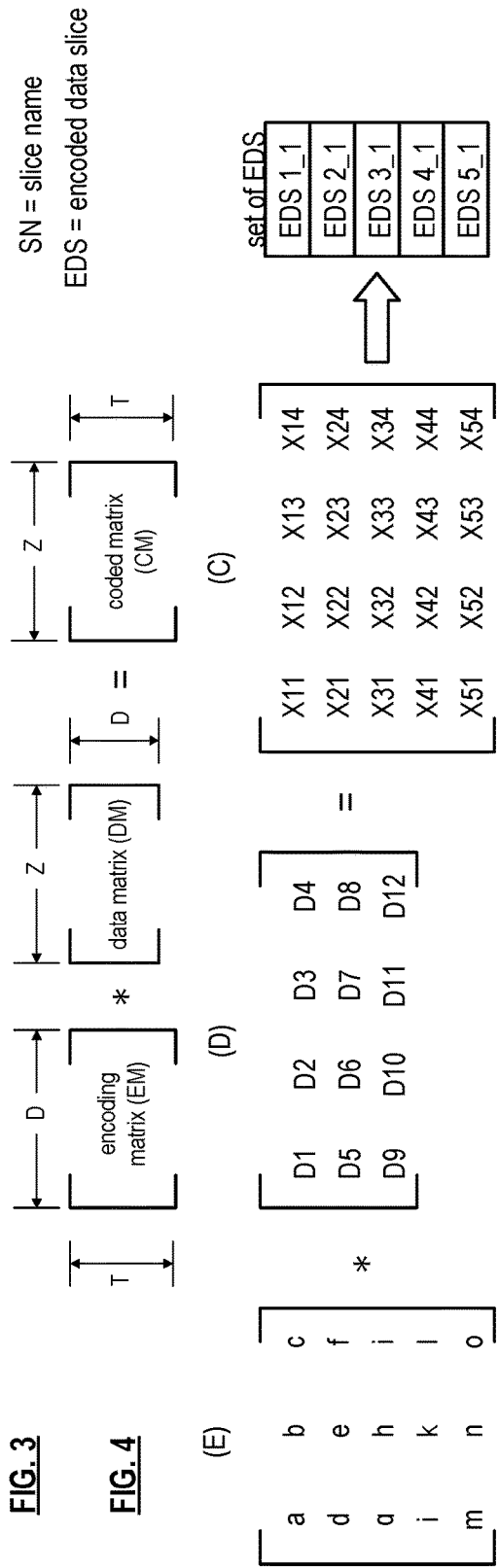
FIG. 3
FIG. 4
FIG. 5
FIG. 6

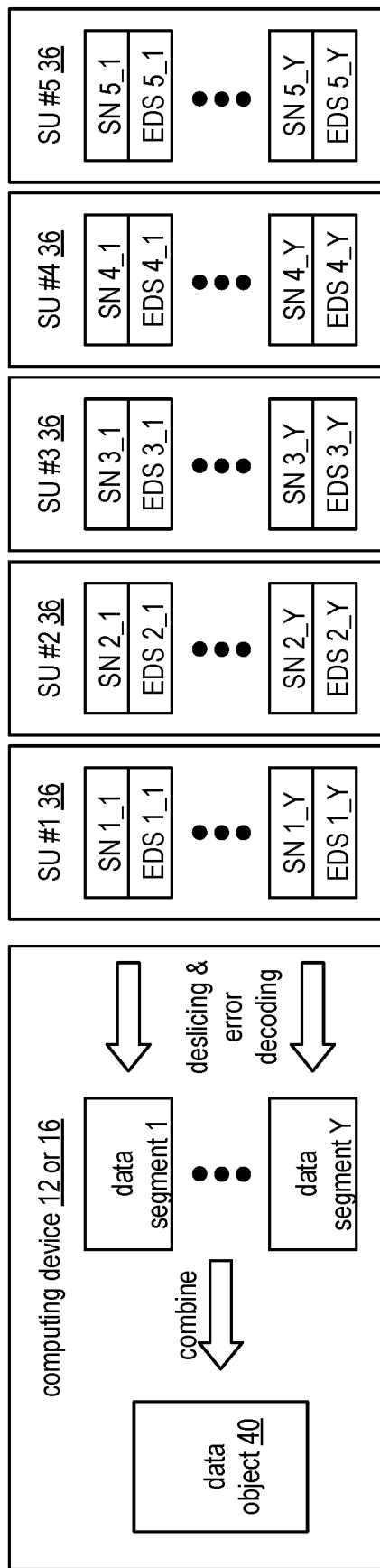

US 10,635,360 B1

ADJUSTING DATA INGEST BASED ON COMPACTION RATE IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
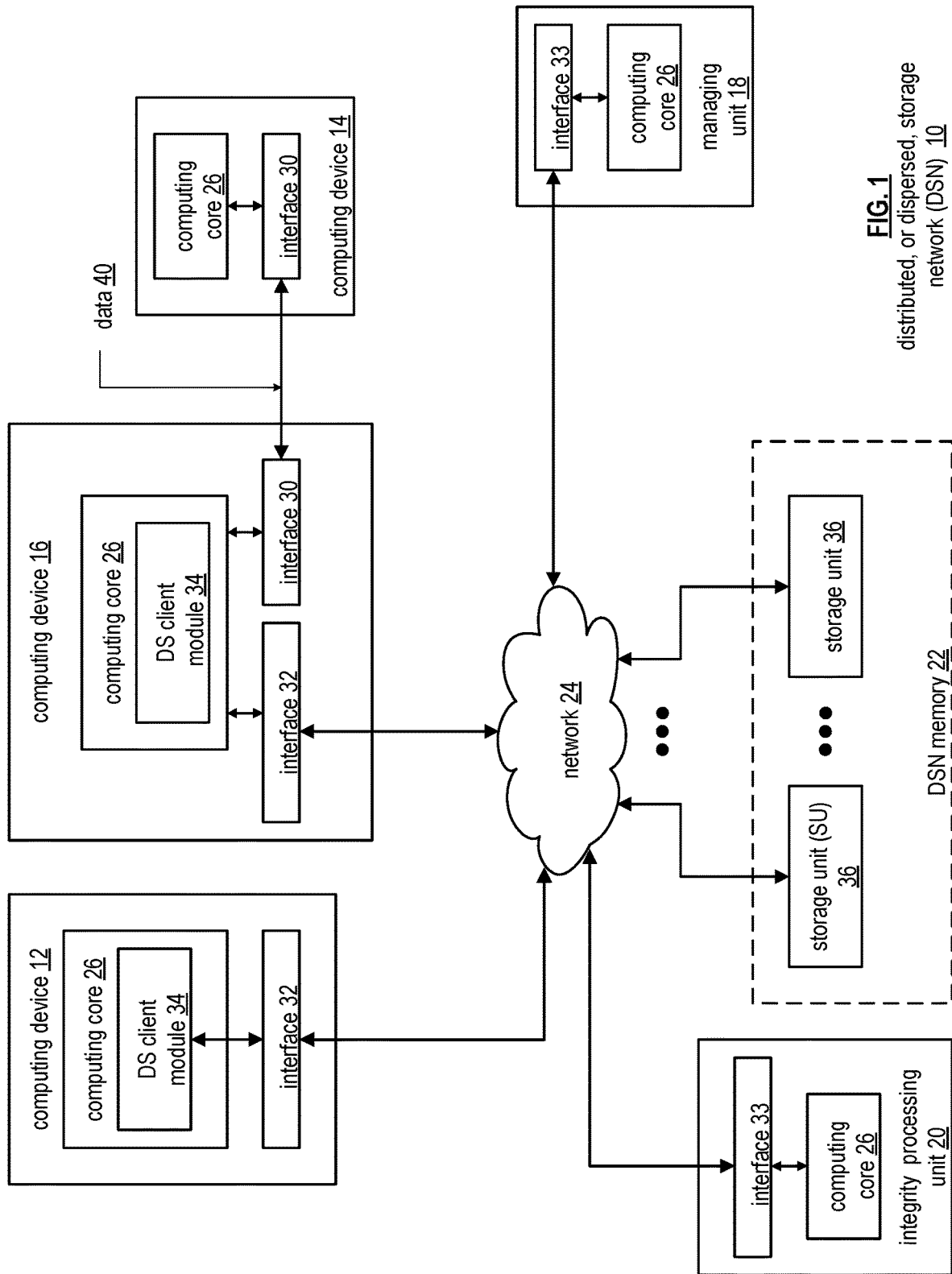
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
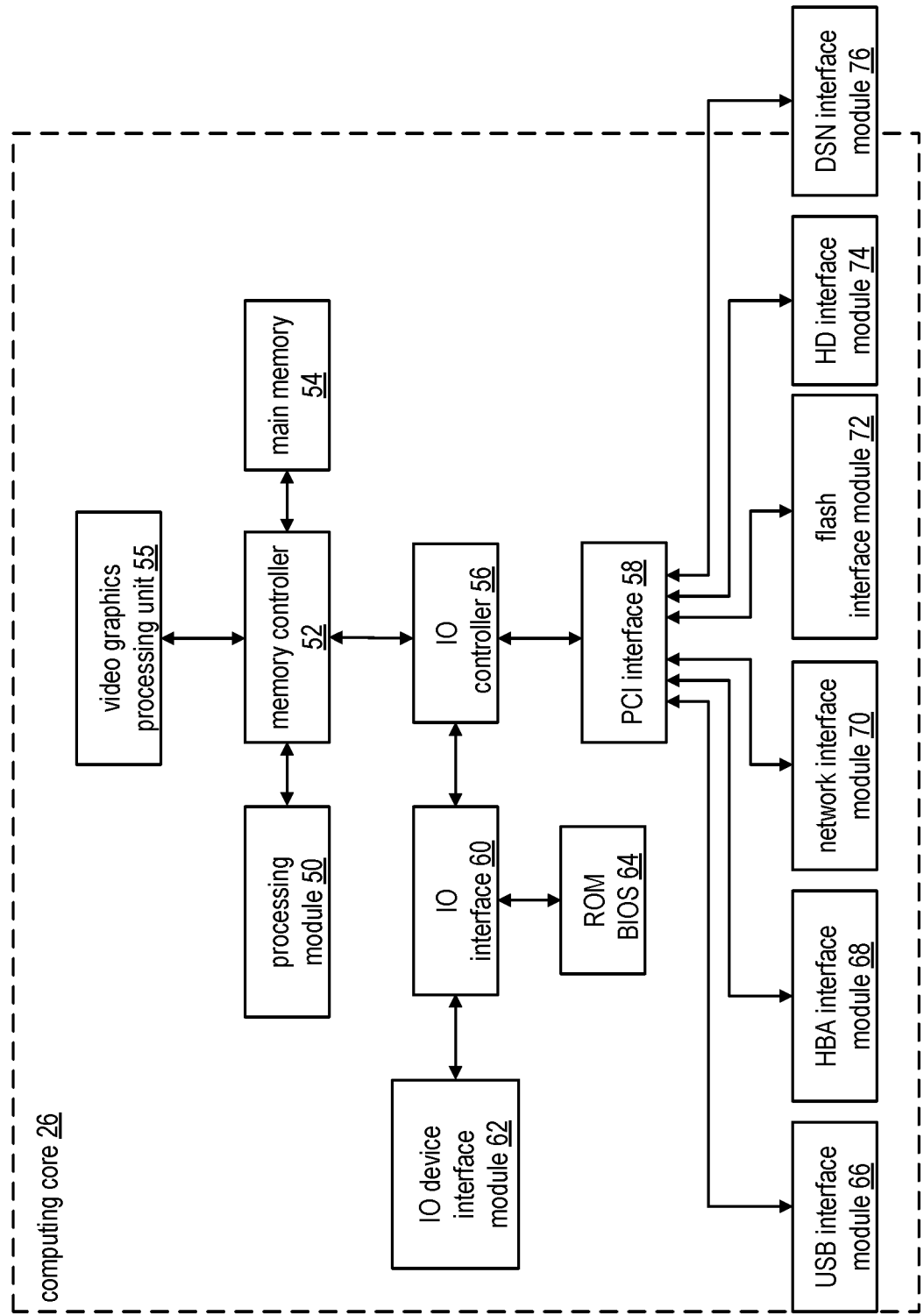
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
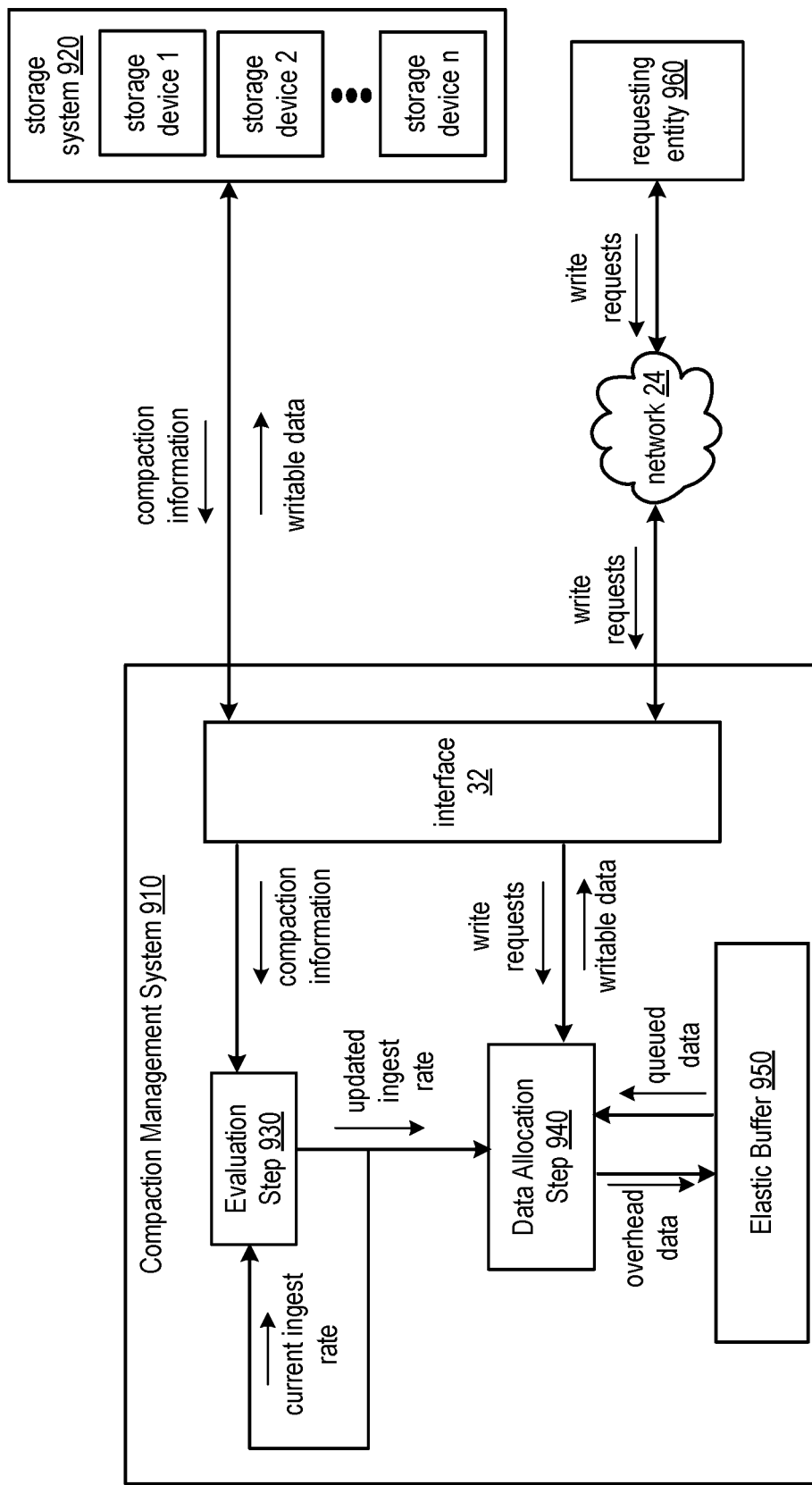
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a compaction management system 910 and a storage system 920 that includes one or more storage devices. The compaction management system 910 functions to dynamically set compaction rate based on a data ingest rate. The DSN can include at least one compaction management system 910 that utilizes a feedback mechanism that estimates compaction rate, and feeds this information into an ingest throttling algorithm such that corresponding storage systems can sustain load.

The compaction managing system 910 can be implemented by utilizing at least one DS client device 34, at least one computing core 26, and/or or at least one other processing system that includes at least one processor and memory to perform the functions of the evaluation step 930 and/or the data allocation step. The elastic buffer 950 can utilize a memory device of computing core 26 or another memory device, and can correspond to a local cache, queue, or other local memory managed directly by the compaction managing system. The compaction managing system can include an interface 32 of FIG. 1 or other interface operable to send and receive data to and from the storage system 920.

The storage system 920 denotes one or more storage devices of one or more storage units 36 managed by the compaction managing system. The storage system 920 includes portions of memory that compaction managing system 910 manages, and can include a portion of memory of one or more single storage devices, can include a single storage device within a storage unit 36 that includes multiple storage devices, can include a proper subset of storage devices of a storage unit 36, and/or can include some or all memory sections of a plurality of storage units 36, which can include some or all of the storage units 36 of DSN memory 22.

At least one storage device of the storage system 920, or another processing system of the storage system, can include its own at least one processor and memory that stores operational instructions that, when executed by the at least one processor, cause the storage system to generate compaction information that indicates, for example, a number of compaction runs in one or more observed timeframes and/or the amount of compactable space created during one or more observed timeframes. This information can be received separately for each storage device or can be received as aggregate information for some or all the storage devices of the storage system. This information can also be determined locally by the compaction management system, for example, based on write confirmations received from the storage system in response to successful data storage within the timeframe. Furthermore, the storage system can be operable to receive data received from the compaction management system 910 or other entity communicating with the compaction management system 910, and can store the received data in the one or more storage devices of the storage system.

In some embodiments, the storage system 920 can correspond to the storage devices of a single storage unit 36. In some embodiments where a single storage unit 36 of FIG. 1 includes multiple storage devices, such as different types of storage devices, a storage unit 36 can include multiple compaction managing systems 910, each managing their own storage device and/or a subset of storage devices of the storage unit 36. For example, the storage unit 36 of FIG. 1 can be configured to implement one or more compaction managing systems 910 for their own memory by utilizing their own DS client device 34, at least one computing core 26. In such embodiments, the compaction information can be retrieved from the storage devices within the same storage unit 36 via a wired and/or local connection that does not utilize network 24, and/or write instruction indicating writable data to be stored can be sent to the storage devices within the same storage unit 36 via a wired and/or local connection that does not utilize network 24.

In some embodiments, a compaction managing system 910 can be responsible for managing compaction across multiple storage units 36, and the storage system 920 can include one or more storage devices of multiple storage units 36. For example, the compaction managing system 910 can be integrated within a computing device 16 that manages access requests to a corresponding set of storage units 36, where the compaction managing system 910 manages compaction in this set of storage units 36. As another example, the compaction managing system 910 can communicate bidirectionally with a set of storage units 36 to oversee and/or facilitate data access with set of storage units 36 via network 24, and/or to control compaction rate of the set of storage units. The compaction information can be retrieved from some or all of the set of storage unit 36 via network 24, where the compaction information is sent from storage units 36 individually. Write instructions indicating writable data to be stored can be sent individually to some or all of the set of storage units of the storage system via network 24.

In some embodiments, some or all storage devices of the storage system 920 can utilize Append Only Memory Devices (AOMDs). Log-based structures with a few append points are used to write new data that is cached and optimized as a sequential access to the memory device. The storage devices can utilize compaction, where overwrite and delete operations create unreferenced space on the memory device which should be reclaimed at a later point of time in order to better utilize the existing memory space. This can be a rather expensive process that requires moving a lot of data to reclaim available space.

This process can be efficient at low memory utilization level when it is possible to wait longer for a single unit of compaction. For example, in the case of AOMD this single unit of compaction can be is a single memory structure, such as a zone in SMR hard drives or a page in an SSD device. When there is less live data, the compaction processes is cheaper, utilizes less resources, is more efficient, has a smaller performance impact, and/or does not have as negative of an impact on performance. For example, the compaction process can be determined to be favorable for data and/or a portion of memory that is updated or otherwise accessed infrequently, and/or for data and/or a portion of memory with an update and/or access frequency that compares favorably to a low access frequency threshold. In such embodiments, some portions of memory can become completely empty, which can effectively turn compaction into I/O free operation.

However, at high utilization, the compaction becomes less efficient as periods between compactions and amount of reclaimed space is reduced whereas the amount of data to be moved increases. For example, the compaction process can be determined to be unfavorable when utilization corresponds to at least a 90% utilization level or higher, for data and/or a portion of memory that is updated or otherwise accessed frequently, and/or for data or a portion of memory with an update and/or access frequency that compares favorably to a high access frequency threshold. This can lead to system inability to reclaim space sufficient to maintain normally sustainable ingest rate.

A compaction managing system 910 can be utilized to manage high levels of compaction. The compaction managing system 910 can include at least one processor and memory that stores operational instructions that cause the at least one processor to throttle new data ingest such that at least one AOMD or other at least one storage device of at least one storage unit 36 associated with the compaction managing system 910 is capable of maintaining free space sufficient to write new data in presence of a high level of compaction. This can be accomplished by utilizing a feedback mechanism that estimates compaction rate and feeds this data into an ingest throttling algorithm, allowing the storage unit 36 to sustain system load without losing functionality by sacrificing throughput and latency at a high space utilization.

As shown in FIG. 9, the compaction managing system 910 can receive compaction information from the storage system. The compaction information can correspond to one or more observed timeframe, such as a most recent observed timeframe. The compaction managing system 910 can perform the evaluation step 930 in response to receiving the compaction information. This can include determining the amount of data compacted in the storage system 920 during the observed timeframe based on the compaction information. In some cases, this determining includes detecting how much data has been compacted already within the observed timeframe. A compaction rate can then be estimated from the observed behavior during the latest compaction runs in one or more observed timeframes and/or the amount of compactable space created during one or more observed timeframes. This estimated compaction rate can correspond to an estimation of how much data will be compacted in a future timeframe and/or how much compactable space will created during the future timeframe, such as a timeframe beginning at the current time and/or a timeframe that is about to occur.

In some embodiments, this estimated compaction rate can correspond to an actual rate of compaction that occurred in one or more observed timeframes, where the estimated compaction rate is set equal to, or otherwise determined based on, this actual compaction rate in the one or more observed timeframes. In some embodiments, the estimated compaction rate is based on a current ingest rate. In some embodiments, the compaction managing system can utilize trends or other information observed in the observed timeframe and/or can utilize current state data to determine the estimated compaction rate. For example, the estimated compaction rate can be determined based on such as the amount of free data in the storage system, the size of a consecutive section of free data in the storage system, the sizes of multiple consecutive sections of free data in the storage system, trends of data ingestion rates at corresponding time frames, a number of or frequency of access requests for data stored in the storage system, the age of data stored in the storage system, a number of access requests for data stored in the storage system that have been received but have not yet been processed, access trends for the data stored in the storage system, indication in metadata of the data stored in the storage system, performance metrics and/or health indicators for storage devices of the storage system, the type of storage devices used by the storage system, and/or based on other information. In some embodiments, generating the estimated compaction rate includes estimating a number of deletes and/or overwrites that will be performed in the storage system during the future timeframe based on a frequency of deletes and/or overwrites, based on an expected amount of deletes and/or overwrites based on the age of data stored in the storage system, and/or based on other observed trends of access to data that requires deletes and/or overwrites. In some embodiments, historical compaction information over a plurality of past, observed timeframes can be stored and aggregated, and the estimated compaction rate can be based on compaction information in include an observed timeframe that corresponds to a same timeframe type in a schedule, such as a same time of day, week, or year and/or same time of a custom schedule.

Once the estimated compaction rate is determined, the evaluation step 930 can continue with the compaction managing system 910 generating an updated ingest rate based on the current ingest rate and the estimated compaction rate. This can include determining whether to or not adjust a current ingest rate based on the current ingest rate and the estimated compaction rate. In some embodiments, the compaction managing system 910 can determine to lower the ingest rate from the current ingest rate when the current ingest rate compares unfavorably to the estimated compaction rate. For example, the current ingest rate can be determined to compare unfavorably to the estimated compaction rate when an evaluation of the current ingest rate and the estimated compaction rate indicates the current ingest rate is expected to exceed a speed of space reclamation indicated by the estimated compaction rate. The compaction managing system 910 can determine to raise the ingest rate from the current ingest rate and/or keep the ingest rate the same as the current ingest rate when the current ingest rate compares favorably to the estimated compaction rate. For example the current ingest rate can be determined to compare favorably to the estimated compaction rate when an evaluation of the current ingest rate and the estimated compaction rate indicates the ingest rate is not expected to exceed a speed of space reclamation indicated by the estimated compaction rate.

In some embodiments, a difference function is performed on the current ingest rate and the estimated compaction rate to determine the updated ingest rate. A magnitude of an amount that the ingest rate decreases from the current ingest rate can be determined as a direct function or monotonically increasing function of a magnitude of the difference between the current ingest rate and the estimated compaction rate when the current ingest rate compares unfavorably to the estimated compaction rate. Alternatively or in addition, a magnitude of an amount that the ingest rate decreases from the current ingest rate can be determined as a direct function or monotonically increasing function of a magnitude of the difference between the current ingest rate and the estimated compaction rate when the current ingest rate compares favorably to the estimated compaction rate.

In some embodiments, an ideal ingest rate can be determined as a function of the estimated compaction rate, and the updated ingest rate can be generated to match or otherwise compare favorably to the ideal ingest rate. For example, the ideal ingest rate can correspond to meeting but not exceeding a speed of space reclamation dictated by the estimated compaction rate. This can be accomplished by determining a maximum ingest rate that does not exceed the speed of space reclamation indicated by the estimated compaction rate, and setting the updated ingest rate equal to the maximum ingest rate. The magnitude of an amount that the ingest rate decreases or increases can be determined such that the resulting ingest rate is equal to this ideal ingest rate.

In some embodiments, a magnitude of buffer from the ideal ingest rate is determined as an increasing function of the difference between the difference between the a most recently estimated compaction rate and the currently estimated compaction rate, and/or the magnitude of buffer from the ideal ingest rate is determined as an increasing function of a determined uncertainty level generated in calculating the estimated compaction rate, for example, to further ensure that the ingest rate will not exceed the actual speed of space reclamation that occurs, allowing a higher buffer in cases of higher uncertainty and/or cases where greater deviation from the estimated compaction rate may occur.

In some embodiments, adaptive schemes are utilized, for example, where the ingest rate asymptotically converges to an ideal ingest rate and/or another determined ideal state. As shown in FIG. 9 the compaction management system 910 can implements a feedback control loop to adaptively adjust the ingest rate over time in response to updated compaction information received over time to generate the estimated compaction rates over time. In particular, the updated ingest rate determined in a previous iteration for a first observed timeframe can be utilized as the current ingest rate for a next consecutive observed timeframe in conjunction with subsequently received compaction data for the next consecutive observed timeframe to generate the next updated ingest rate. In some embodiments, the ingest rate may fluctuate above and/or below the estimated compaction rate over time. The magnitude of this fluctuation above and/or below the estimated compaction rate can decrease over time as the ingest rate converges to the ideal ingest rate.

Once the ingest rate is adjusted, the compaction management system 910 can facilitate storage of new data in accordance with the updated ingest rate by performing data allocation step 940. In some embodiments where the ingest rate is decreased, some excess data to be written to the storage system can be queued and/or otherwise buffered, for example, by utilizing an elastic buffer 950. This can allow the compaction management system 910 to tolerate spikes of ingest rate while under heavy compaction load.

The compaction management system can receive new data for storage indicated in write requests from one or more requesting entities 960 via network 24, where requesting entity 960 utilizes, for example, a user device 14 and/or a computing device 16. The new data can correspond to data that is not already written to the storage system, where the write requests do not correspond to updates to existing data, and instead correspond to addition of new data. A proper subset of received data to be written to the storage system can be selected as writable data, where the amount of writable data corresponds to the updated ingest rate. The remaining subset of data can be stored in buffer 950 temporarily as overhead data. The compaction management system 910 can determine which data will be buffered based on priority associated with the data and/or recency of the write request, for example, where highest priority and/or oldest requests are written first. In some embodiments, the compaction system can send data for storage in the storage system to a different storage system, for example, managed by a different compaction system determined to have a higher ingest rate or otherwise determined to have an ingest rate able to manage this additional data. In some embodiments, selecting the writable data for a timeframe includes selecting a proper subset of the received data and includes further retrieving some or all of the overhead data in the buffer, where a portion of the writable data is a proper subset of the received data, and where the remaining writable data was retrieved from the buffer.

In some embodiments, all incoming data is queued in the elastic buffer 950, and data is removed from the queue in accordance with a FIFO policy or other ordered priority when it is to be written to the storage system. The amount of data removed from the queue within a fixed timeframe can be variable, and this amount can be determined to correspond to the updated ingest rate, calculated as a function of the updated ingest rate and the length of the fixed timeframe. Alternatively, a variable frequency at which a fixed amount of data is removed from the queue can be determined to correspond to the updated ingest rate, calculated as a function of the updated ingest rate and the size of the fixed amount of data.

In some embodiments, the compaction management system 910 writes the data and/or sends write requests to storage units itself and/or stores the buffered data itself. In other embodiments, the compaction management system 910 sends instructions indicating updates to the ingest rate to another entity, such as one or more computing devices 16, that is responsible for storing data in the storage system and/or responsible for sending write requests to storage units. In such embodiments, the one or more computing devices 16 can buffer data itself in accordance with the updates to the ingest rate received from the compaction management system 910.

In some embodiments, a compaction management system 910 managing multiple storage devices within the same storage units 36 and/or multiple storage units 36 can receive compaction feedback from multiple storage devices, can determine estimated compaction rates for these multiple storage devices separately, can adjust data ingest rates for these multiple storage devices separately based on their respective estimated compaction rates, and determine where to store incoming data based on the respective data ingest rates of the multiple storage devices and/or multiple storage units, for example selecting storage devices and/or storage units for incoming data strategically to maintain ideal data ingest rates across all the storage devices managed by the compaction management system 910, where these ideal data ingest rates can be continued to be adjusted dynamically by the compaction management system 910 for some or all storage units 36 based on the compaction rate information it continues to receives from these storage units 36.

For example, consider a compaction managing system 910 managing a set of storage units 36 of DSN memory 22. A data segment can be received for storage and can be dispersed storage error encoded to generate a plurality of encoded slices for storage. For example, by a computing device 16 associated with the managing a set of storage units 36 can perform these steps and/or the compaction managing system 910 can perform these steps. A write threshold number of the set of storage units, or other information dispersal algorithm (IDA) threshold number of the set of storage units can be selected as a proper subset of the set of storage units managed by the compaction managing system 910 for storage of the plurality of encoded data slices. The selection of the proper subset of the set of storage units for each set of encoded slices of incoming data segments can be selected strategically to maintain ideal data ingest rates across all the storage devices managed by the compaction management system 910, where these ideal data ingest rates can be continued to be adjusted dynamically by the compaction management system 910 for some or all storage units 36 based on the compaction rate information it receives.

In some embodiments a hierarchy of compaction management systems 910 are included in the DSN, for example where lower tier compaction management systems 910 manage individual single storage devices and/or single storage units, and higher tier compaction management systems 910 manage multiple storage devices and/or multiple storage units. The hierarchy can include any number of tiers of compaction management systems 910. Lower tier compaction management systems 910 can locally manage compaction, and can generate its own estimated compaction rates based on its own observed compaction, and can adjust its own ingest rate locally. Updates to the ingest rate, estimated compaction rates, and/or raw compaction information can be sent to second tier compaction management systems 910. The second tier compaction management systems can adjust how data is distributed for storage amongst a plurality of lower tier compaction management systems 910 within its storage system based on the ingest rate, estimated compaction rates, and/or raw compaction information received from some or all of the plurality of lower tier compaction management systems 910 in compliance with their respective ingest rates. In some embodiments, these second tier compaction management systems can also generate its own aggregate adjusted ingest rate based on an aggregate estimated compaction rate determined based on the estimated compaction rates received across all of the lower tier compaction management systems 910 in its storage system, and can buffer some incoming data accordingly. Furthermore, this aggregate adjusted ingest rate, aggregate estimated compaction rate and/or the ingest rates, estimated compaction rates, and/or raw compaction information received from lower tier compaction management systems 910 can be sent up to third tier systems that manage a plurality of second tier systems. The third tier compaction management systems 910 can behave similarly to second tier systems, by adjusting how data is distributed for storage amongst a plurality of second tier compaction management systems 910 within its storage system based on the ingest rate, estimated compaction rates, and/or raw compaction information received from some or all of the plurality of second tier compaction management systems 910 in compliance with their respective ingest rates, and/or by generate its own aggregate adjusted ingest rate based on an aggregate estimated compaction rate determined based on the estimated compaction rates received across all of the second tier compaction management systems 910 in its storage system, can buffer some incoming data accordingly, and/or can send some or all of this information up to an even higher tier compaction management systems 910. This process can be reflected for any number of tiers of compaction management systems.

The user device 14 and/or computing device 16 can be operable to send access requests to the storage units via network 24. The access requests can include data slices to be written to storage, read requests, and/or task requests. The user device 14 and/or computing device 16 can receive data slices stored by the storage units in response. One or more computing devices 16 and/or user devices 14 can generate the data slices for storage by performing a dispersed storage error encoding function on a set of data segments for storage, where the encoded data slices of a data segment are transmitted to an information dispersal algorithm (IDA) width threshold number of storage units 36. One or more computing devices 16 and/or user devices 14 can recover a data segment by retrieving at least an IDA decode threshold number of encoded data slices from at least a corresponding IDA decode threshold number of storage units, and by performing a dispersed storage error decoding function on the received encoded data slices. In some embodiments, one or more user devices 14, one or more computing devices 16, and/or one or more storage devices 36 is implemented by utilizing a compaction management system 910.

Figure 10:
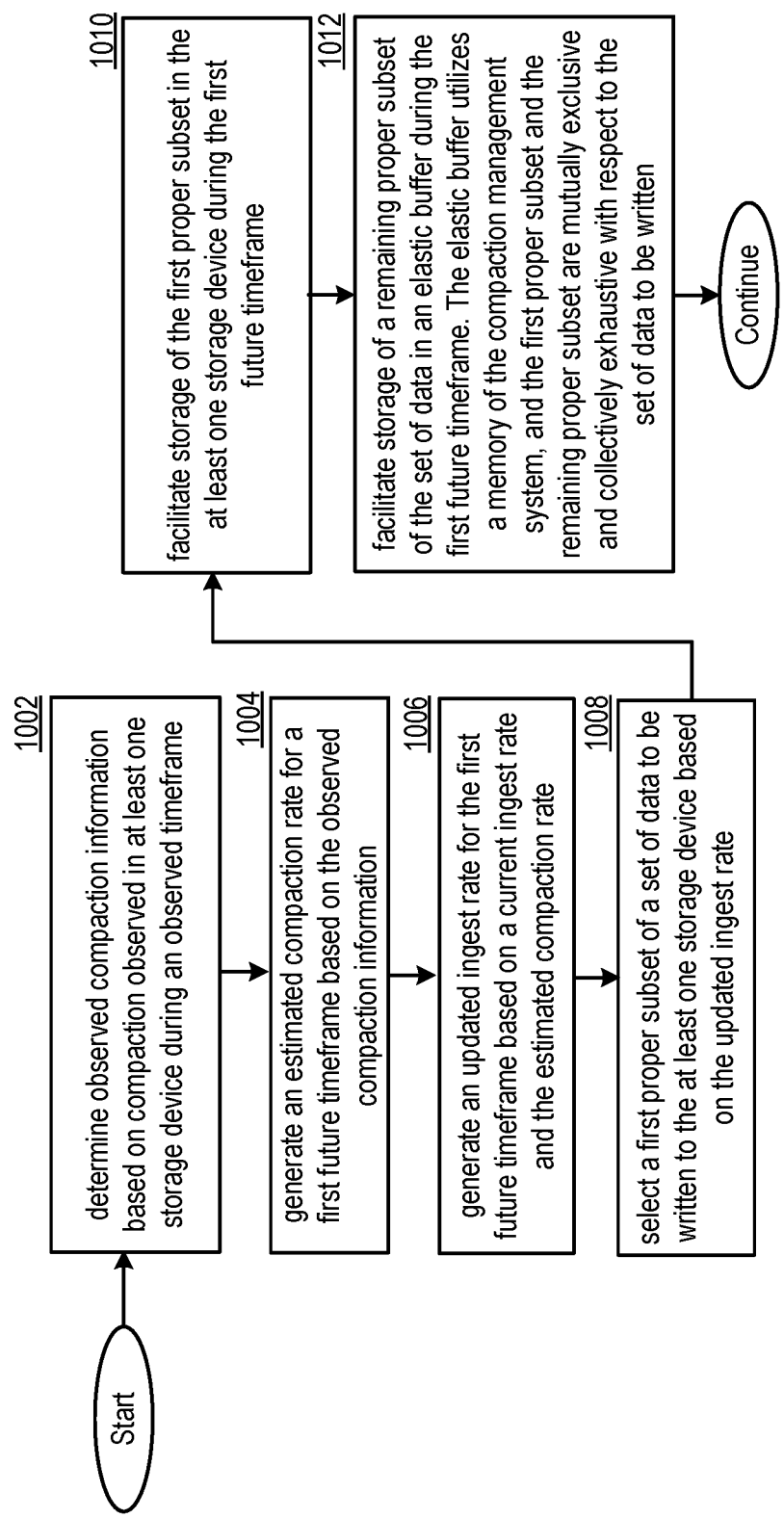
FIG. 10 is a logic diagram of an example of a method of adjusting data ingest based on compaction rate in accordance with the present invention.

FIG. 10 is a flowchart illustrating an example of adjusting data ingest based on compaction rate. In particular, a method is presented for use in association with one or more functions and features described in conjunction with FIGS. 1-9, for execution by a compaction management system that includes a processor, via a storage unit 36, via a computing device 16, or via another processing system of a dispersed storage network that includes at least one processor and memory that stores instruction that configure the processor or processors to perform the steps described below.

Step 1002 includes determining observed compaction information based on compaction observed in at least one storage device during an observed timeframe. Step 1004 includes generating an estimated compaction rate for a first future timeframe based on the observed compaction information. Step 1006 includes generating an updated ingest rate for the first future timeframe based on a current ingest rate and the estimated compaction rate. Step 1008 includes selecting a first proper subset of a set of data to be written to the at least one storage device based on the updated ingest rate. Step 1010 includes facilitating storage of the first proper subset in the at least one storage device during the first future timeframe. Step 1012 includes facilitate storage of a remaining proper subset of the set of data in an elastic buffer during the first future timeframe. The elastic buffer can utilize a memory of the compaction management system, where the memory is different from the at least one storage device. The first proper subset and the remaining proper subset can be mutually exclusive and collectively exhaustive with respect to the set of data to be written.

In various embodiments, second observed compaction information is determined based on compaction observed in the at least one storage device during the first future timeframe in response to the first future timeframe elapsing. A second estimated compaction rate is generated for a second future timeframe based on the observed compaction information, where the second future timeframe begins after the first future timeframe has elapsed. A second updated ingest rate is generated for the first future timeframe based on the updated ingest rate and the second estimated compaction rate. A second proper subset of a second set of data to be written to the at least one storage device is selected based on the second updated ingest rate. Storage of the second proper subset in the at least one storage device is facilitated during the second future timeframe. Storage of a second remaining proper subset of the second set of data in the elastic buffer is facilitated during the second future timeframe. The second proper subset and the second remaining proper subset are mutually exclusive and collectively exhaustive with respect to the second set of data to be written. In various embodiments, the second proper subset includes a third subset of the remaining proper subset. Facilitating storage of the second proper subset includes retrieving the third subset of the remaining proper subset from the elastic buffer during the second future timeframe for storage in the at least one storage device.

In various embodiments, the at least one storage device includes at least one Append Only Memory Device (AOMD). Determining the observed compaction information includes determining an amount of unreferenced space created as a result of overwrite and delete operations performed in the at least one AOMD during the observed timeframe. In various embodiments, generating the estimated compaction rate includes estimating a number of overwrites and deletes that will be performed in the at least one AOMD based on age of data stored in the at least one AOMD, and further based on a number of overwrites and deletes that were performed in the at least one AOMD during the observed timeframe.

In various embodiments, generating the updated ingest rate includes determining whether utilizing the current ingest rate in the first future timeframe is expected to exceed a speed of space reclamation indicated by the estimated compaction rate. The current ingest rate is reduced to generate the updated ingest rate in response to determining that the current ingest rate in the first future timeframe is expected to exceed the speed of space reclamation indicated by the estimated compaction rate. In various embodiments, a magnitude of an amount that the updated ingest rate is reduced from the current ingest rate is determined as a monotonically increasing function of a magnitude of a difference between the current ingest rate and the estimated compaction rate. In various embodiments, generating the updated ingest rate further includes determining whether utilizing the current ingest rate in the first future timeframe is expected to exceed a speed of space reclamation indicated by the estimated compaction rate. The current ingest rate is increased to generate the updated ingest rate in response to determining that the current ingest rate in the first future timeframe is not expected to exceed the speed of space reclamation indicated by the estimated compaction rate. The updated ingest rate is also not expected to exceed the speed of space reclamation.

In various embodiments, generating the updated ingest rate includes determining a maximum ingest rate that does not exceed a speed of space reclamation indicated by the estimated compaction rate. The updated ingest rate is set equal to the maximum ingest rate. In various embodiments, an amount of uncertainty associated with the estimated compaction rate is determined. A magnitude of a ingest rate buffer is determined as a monotonically increasing function of the amount of uncertainty. The maximum ingest rate is reduced by the magnitude of the ingest rate buffer to generate the updated ingest rate. In various embodiments, determining the observed compaction information includes determining an observed compaction rate. Generating the estimated compaction rate for the first future timeframe includes setting the estimated compaction rate equal to the observed compaction rate.

In various embodiments, the at least one storage device includes a set of storage units. The set of data to be stored in the at least one storage device includes a set of encoded slices for storage in the set of storage units, where a data segment was dispersed storage error encoded to produce the set of encoded slices. Determining the observed compaction information includes receiving compaction information from the set of storage units via a network, and facilitating storage of the first proper subset includes transmitting at least one of the set of encoded data slices to at least one of the set of storage units via the network.

In various embodiments, the compaction management system and the at least one storage device is incorporated within one of a set of storage units. The set of data to be stored includes one of a set of encoded data slices, where a data segment was dispersed storage error encoded to produce the set of encoded data slices for storage in the set of storage units. The one of the set of encoded data slices is received via a network.

In various embodiments, a non-transitory computer readable storage medium includes at least one memory section that stores operational instructions that, when executed by a processing system of a dispersed storage network (DSN) that includes a processor and a memory, causes the processing system to determine observed compaction information based on compaction observed in at least one storage device during an observed timeframe. An estimated compaction rate is generated for a first future timeframe based on the observed compaction information. An updated ingest rate is generated for the first future timeframe based on a current ingest rate and the estimated compaction rate. A first proper subset of a set of data to be written to the at least one storage device is generated based on the updated ingest rate. Storage of the first proper subset in the at least one storage device is facilitated during the first future timeframe. Storage of a remaining proper subset of the set of data in an elastic buffer is facilitated during the first future timeframe, where the elastic buffer utilizes a memory of the compaction management system that is different from the at least one storage device. The first proper subset and the remaining proper subset are mutually exclusive and collectively exhaustive with respect to the set of data to be written.

Figure 11:
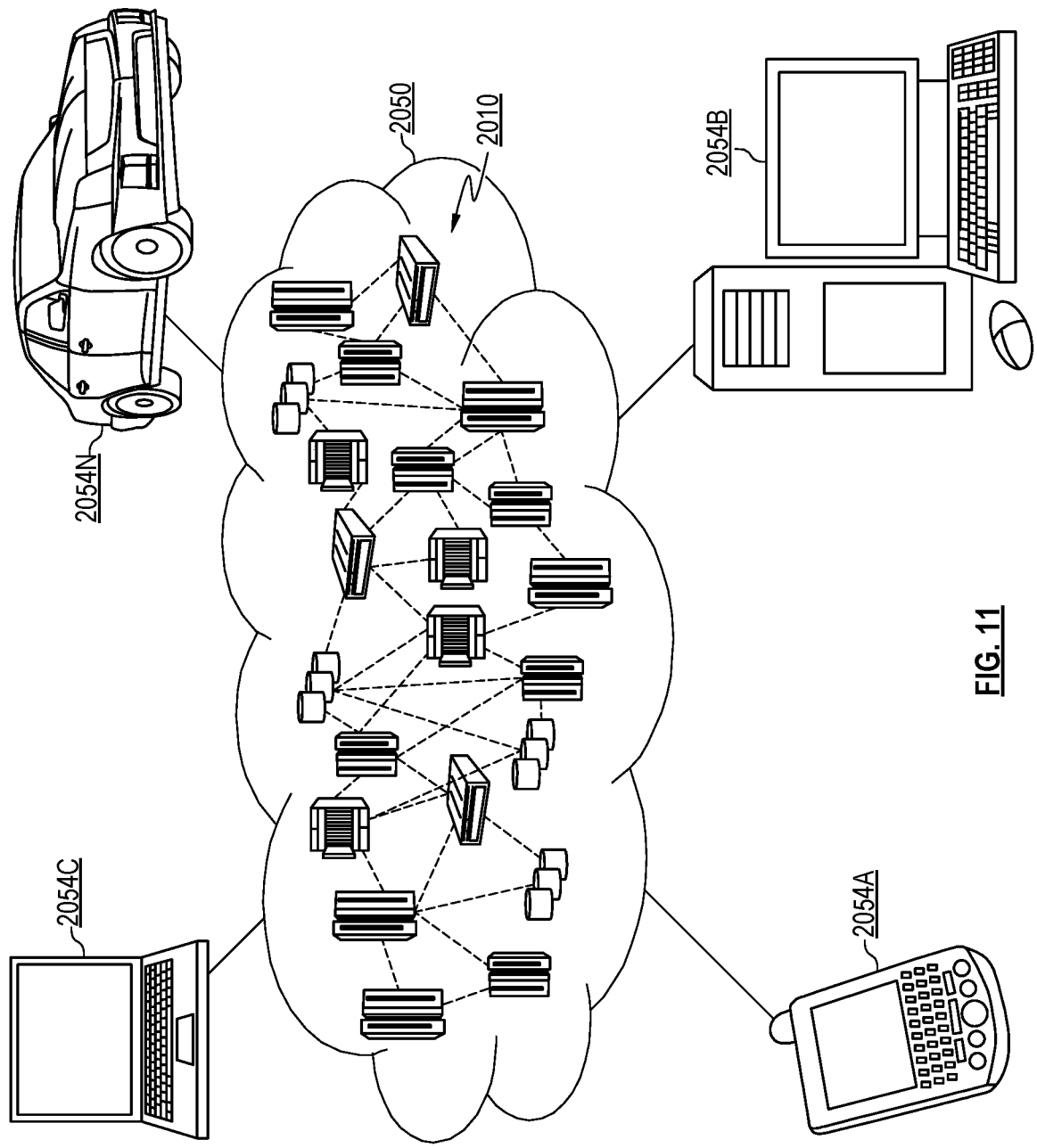
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
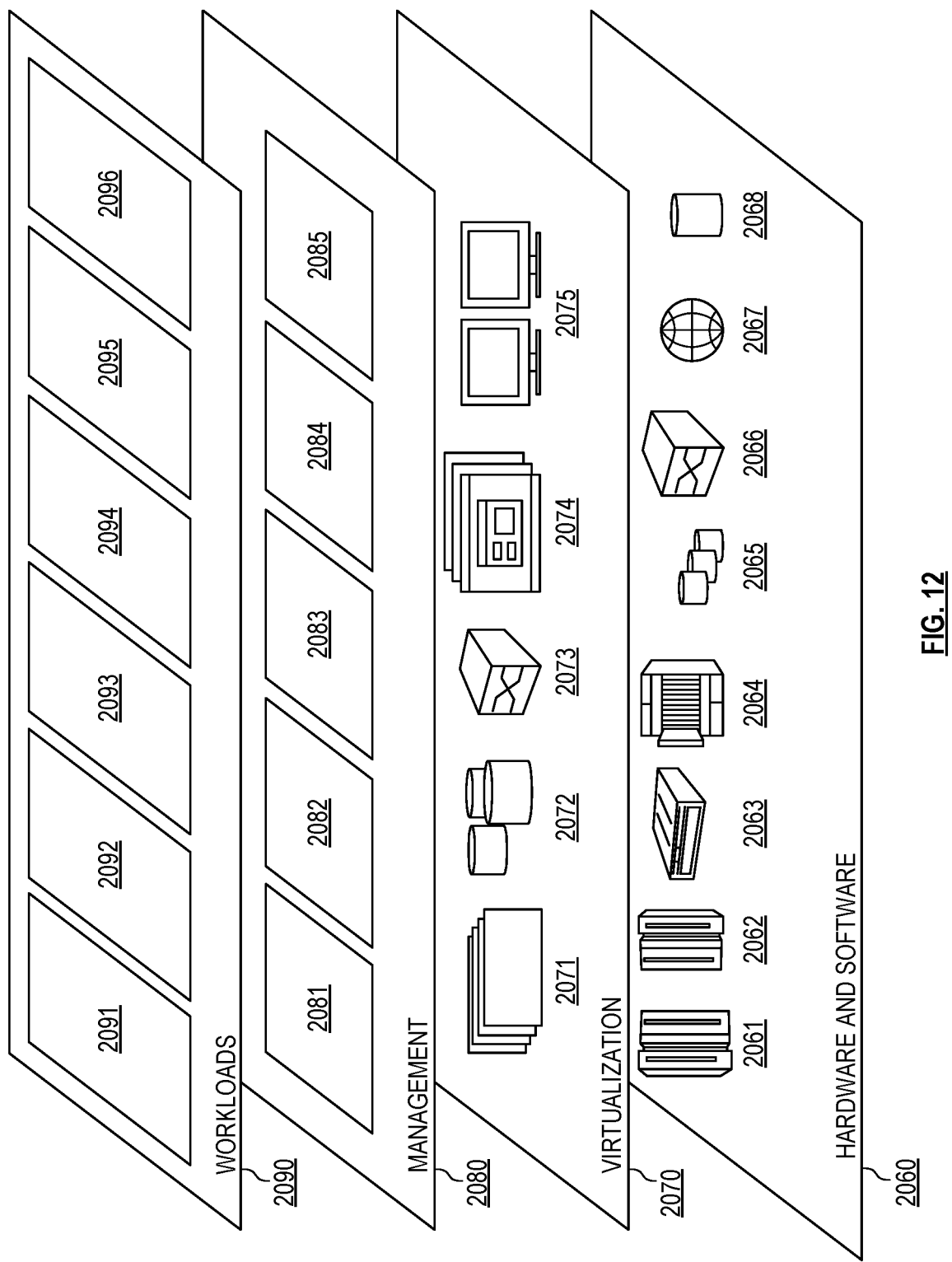
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and compaction management system 2096. In some embodiments, the DSN 10 can utilize utilizing the cloud computing environment 2050, for example, by utilizing the compaction management system 2096 of the workloads layer 2090 of FIG. 12 to adjust data ingest based on compaction rate in the DSN as described in conjunction with FIGS. 1-10, where the compaction management system 910 and/or some or all computing devices 12-16 of FIG. 1 communicate with the network via a corresponding node 2010 of the cloud computing environment 2050.

Figure 13:
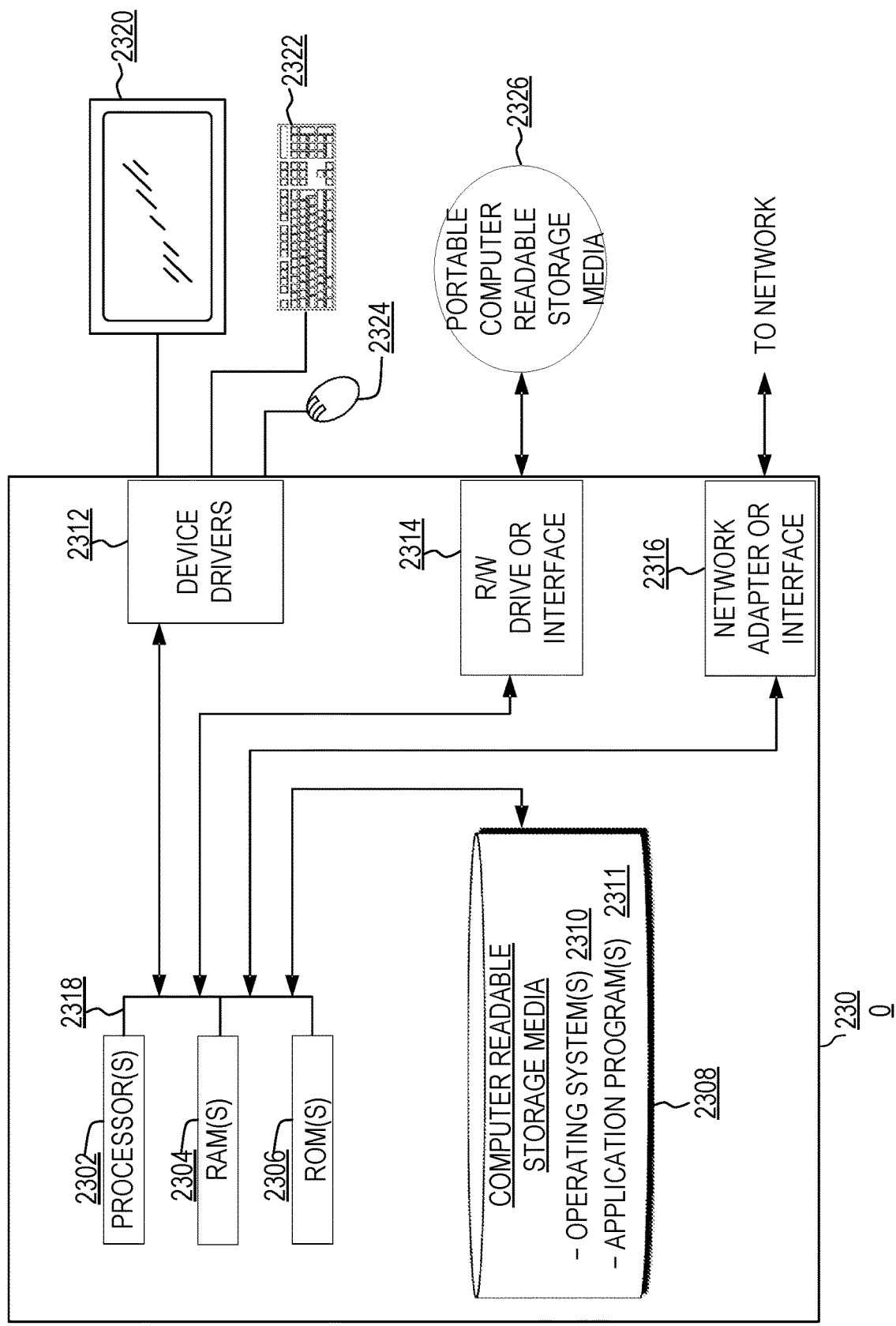
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a compaction management system that includes a processor, the method comprises:
   determining observed compaction information based on compaction observed in at least one storage device during an observed timeframe;
   generating an estimated compaction rate for a first future timeframe based on the observed compaction information;
   generating an updated ingest rate for the first future timeframe based on a current ingest rate and the estimated compaction rate;
   selecting a first proper subset of a set of data to be written to the at least one storage device based on the updated ingest rate;
   facilitating storage of the first proper subset in the at least one storage device during the first future timeframe; and
   facilitating storage of a remaining proper subset of the set of data in an elastic buffer during the first future timeframe, wherein the elastic buffer utilizes a memory of the compaction management system that is different from the at least one storage device, and wherein the first proper subset and the remaining proper subset are mutually exclusive and collectively exhaustive with respect to the set of data to be written.

2. The method of claim 1, further comprising:
   determining second observed compaction information based on compaction observed in the at least one storage device during the first future timeframe in response to the first future timeframe elapsing;
   generating a second estimated compaction rate for a second future timeframe based on the observed compaction information, wherein the second future timeframe begins after the first future timeframe has elapsed;
   generating a second updated ingest rate for the first future timeframe based on the updated ingest rate and the second estimated compaction rate;
   selecting a second proper subset of a second set of data to be written to the at least one storage device based on the second updated ingest rate;
   facilitating storage of the second proper subset in the at least one storage device during the second future timeframe; and
   facilitating storage of a second remaining proper subset of the second set of data in the elastic buffer during the second future timeframe, wherein the second proper subset and the second remaining proper subset are mutually exclusive and collectively exhaustive with respect to the second set of data to be written.

3. The method of claim 2, wherein the second proper subset includes a third subset of the remaining proper subset, and wherein facilitating storage of the second proper subset includes retrieving the third subset of the remaining proper subset from the elastic buffer during the second future timeframe for storage in the at least one storage device.

4. The method of claim 1, wherein the at least one storage device includes at least one Append Only Memory Device (AOMD), and wherein determining the observed compaction information includes determining an amount of unreferenced space created as a result of overwrite and delete operations performed in the at least one AOMD during the observed timeframe.

5. The method of claim 4, wherein generating the estimated compaction rate includes estimating a number of overwrites and deletes that will be performed in the at least one AOMD based on age of data stored in the at least one AOMD, and further based on a number of overwrites and deletes that were performed in the at least one AOMD during the observed timeframe.

6. The method of claim 1, wherein generating the updated ingest rate includes:
   determining whether utilizing the current ingest rate in the first future timeframe is expected to exceed a speed of space reclamation indicated by the estimated compaction rate; and
   reducing the current ingest rate to generate the updated ingest rate in response to determining that the current ingest rate in the first future timeframe is expected to exceed the speed of space reclamation indicated by the estimated compaction rate.

7. The method of claim 6, wherein a magnitude of an amount that the updated ingest rate is reduced from the current ingest rate is determined as a monotonically increasing function of a magnitude of a difference between the current ingest rate and the estimated compaction rate.

8. The method of claim 6, wherein generating the updated ingest rate further includes:
   determining whether utilizing the current ingest rate in the first future timeframe is expected to exceed a speed of space reclamation indicated by the estimated compaction rate; and
   increasing the current ingest rate to generate the updated ingest rate in response to determining that the current ingest rate in the first future timeframe is not expected to exceed the speed of space reclamation indicated by the estimated compaction rate, wherein the updated ingest rate is not expected to exceed the speed of space reclamation.

9. The method of claim 1, wherein generating the updated ingest rate includes:
   determining a maximum ingest rate that does not exceed a speed of space reclamation indicated by the estimated compaction rate; and
   setting the updated ingest rate equal to the maximum ingest rate.

10. The method of claim 1, wherein generating the updated ingest rate includes:
   determining a maximum ingest rate that does not exceed a speed of space reclamation indicated by the estimated compaction rate;

determining an amount of uncertainty associated with the estimated compaction rate;
determining a magnitude of a ingest rate buffer as a monotonically increasing function of the amount of uncertainty; and
reducing the maximum ingest rate by the magnitude of the ingest rate buffer to generate the updated ingest rate.

11. The method of claim 1, wherein determining the observed compaction information includes determining an observed compaction rate, and wherein generating the estimated compaction rate for the first future timeframe includes setting the estimated compaction rate equal to the observed compaction rate.

12. The method of claim 1, wherein the at least one storage device includes a set of storage units, wherein the set of data to be stored in the at least one storage device includes a set of encoded slices for storage in the set of storage units, wherein a data segment was dispersed storage error encoded to produce the set of encoded slices, wherein determining the observed compaction information includes receiving compaction information from the set of storage units via a network, and wherein facilitating storage of the first proper subset includes transmitting at least one of the set of encoded slices to at least one of the set of storage units via the network.

13. The method of claim 1, wherein the compaction management system and the at least one storage device is incorporated within one of a set of storage units, wherein the set of data to be stored includes one of a set of encoded data slices, wherein a data segment was dispersed storage error encoded to produce the set of encoded data slices for storage in the set of storage units, further comprising receiving the one of the set of encoded data slices via a network.

14. A processing system of a compaction management system comprises:
at least one processor;
a memory that stores operational instructions, that when executed by the at least one processor cause the processing system to:
determine observed compaction information based on compaction observed in at least one storage device during an observed timeframe;
generate an estimated compaction rate for a first future timeframe based on the observed compaction information;
generate an updated ingest rate for the first future timeframe based on a current ingest rate and the estimated compaction rate;
select a first proper subset of a set of data to be written to the at least one storage device based on the updated ingest rate;
facilitate storage of the first proper subset in the at least one storage device during the first future timeframe; and
facilitate storage of a remaining proper subset of the set of data in an elastic buffer during the first future timeframe, wherein the elastic buffer utilizes a memory of the compaction management system that is different from the at least one storage device, and wherein the first proper subset and the remaining proper subset are mutually exclusive and collectively exhaustive with respect to the set of data to be written.

15. The processing system of claim 14, wherein the operational instructions, when executed by the at least one processor, further cause the processing system to:
determine second observed compaction information based on compaction observed in the at least one storage device during the first future timeframe in response to the first future timeframe elapsing;
generate a second estimated compaction rate for a second future timeframe based on the observed compaction information, wherein the second future timeframe begins after the first future timeframe has elapsed;
generate a second updated ingest rate for the first future timeframe based on the updated ingest rate and the second estimated compaction rate;
select a second proper subset of a second set of data to be written to the at least one storage device based on the second updated ingest rate;
facilitate storage of the second proper subset in the at least one storage device during the second future timeframe; and
facilitate storage of a second remaining proper subset of the second set of data in the elastic buffer during the second future timeframe, wherein the second proper subset and the second remaining proper subset are mutually exclusive and collectively exhaustive with respect to the second set of data to be written.

16. The processing system of claim 14, wherein the at least one storage device includes at least one Append Only Memory Device (AOMD), and wherein determining the observed compaction information includes determining an amount of unreferenced space created as a result of overwrite and delete operations performed in the at least one AOMD during the observed timeframe.

17. The processing system of claim 14, wherein generating the updated ingest rate includes:
determining whether utilizing the current ingest rate in the first future timeframe is expected to exceed a speed of space reclamation indicated by the estimated compaction rate; and
reducing the current ingest rate to generate the updated ingest rate in response to determining that the current ingest rate in the first future timeframe is expected to exceed the speed of space reclamation indicated by the estimated compaction rate.

18. The processing system of claim 14, wherein generating the updated ingest rate includes:
determining a maximum ingest rate that does not exceed a speed of space reclamation indicated by the estimated compaction rate; and
setting the updated ingest rate equal to the maximum ingest rate.

19. The processing system of claim 14, wherein the at least one storage device includes a set of storage units, wherein the set of data to be stored in the at least one storage device includes a set of encoded slices for storage in the set of storage units, wherein a data segment was dispersed storage error encoded to produce the set of encoded slices, wherein determining the observed compaction information includes receiving compaction information from the set of storage units via a network, and wherein facilitating storage of the first proper subset includes transmitting at least one of the set of encoded slices to at least one of the set of storage units via the network.

20. A computer readable storage medium comprises:
at least one memory section that stores operational instructions that, when executed by a processing system of a dispersed storage network (DSN) that includes a processor and a memory, causes the processing system to:

determine observed compaction information based on compaction observed in at least one storage device during an observed timeframe;

generate an estimated compaction rate for a first future timeframe based on the observed compaction information;

generate an updated ingest rate for the first future timeframe based on a current ingest rate and the estimated compaction rate;

select a first proper subset of a set of data to be written to the at least one storage device based on the updated ingest rate;

facilitate storage of the first proper subset in the at least one storage device during the first future timeframe; and facilitate storage of a remaining proper subset of the set of data in an elastic buffer during the first future timeframe, wherein the elastic buffer utilizes a memory that is different from the at least one storage device, and wherein the first proper subset and the remaining proper subset are mutually exclusive and collectively exhaustive with respect to the set of data to be written.

* * * * *